Sept. 6, 1949. A. E. ANDERSSON 2,481,276
MEASURING INSTRUMENT
Filed March 30, 1944
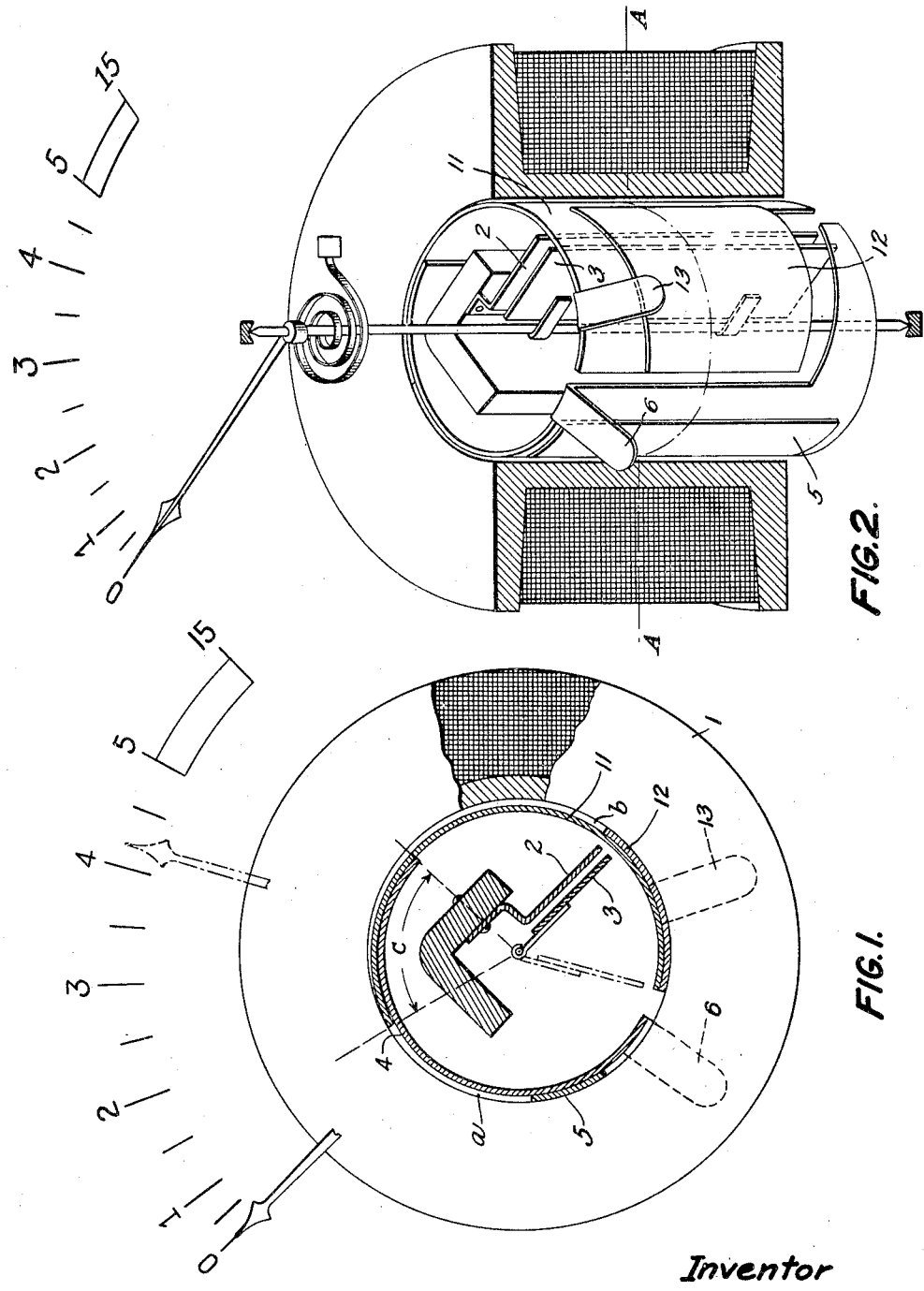
Inventor
A. E. Andersson
By Glascock Downing Reibold
Attorneys Patented Sept. 6, 1949

2,481,276

UNITED STATES PATENT OFFICE 2,481,276

MEASURING INSTRUMENT

Albert Emanuel Andersson, Flysta, Spanga, Sweden, assignor to Telefonaktiebolaget L M Ericsson, Stockholm, Sweden, a company of Sweden Application March 30, 1944, Serial No. 528,764
In Sweden March 2, 1943

3 Claims. (Cl. 171—95)

Movable iron instruments, usually amperemeters, are often manufactured in such a way that the upper portion of the scale is highly crowded. The instruments of this type are to be adjusted after manufacturing so as to give the scale a suitable form, if printed scales are used, to adapt the instrument to the scale, said adjustment implying a very tedious work. By hitherto known instruments said crowded portion is effected in the following way. An additional iron having its point directed against the movable iron is disposed outside the coil in a position adjacent to that attained by the movable iron when the pointer is moved to the beginning of the crowded scale portion. The flux through the coil is concentrated in the rectangular iron strips forming the fixed and the movable irons of the instrument. When the movable iron approaches the additional iron a great part of the flux is directed from the movable iron to the additional iron. In the part of the movable iron being directed against the additional iron there is a magnetic north pole and in the additional iron there is a south pole. The movable iron is first influenced by the additional iron with a force being operative in the deflection direction of the pointer and when the movable iron has passed by the additional iron said movable iron is influenced by a force acting against the deflection direction. The adjustment of the instrument is hereby naturally rendered more difficult. It has been proposed to reduce said drawbacks of the adjustment by using in addition to the mentioned additional iron an especial, radially disposed and stationary iron exerting a repulsive action on the movable iron when the latter approaches its end position. However in this case one is compelled to use two iron strips, the adjustment still being rather tedious. The difficulties of adjusting the additional iron so as to give the scale a suitable distribution are particularly great by such instruments by which, in order to give the part which is not crowded, a suitable form, a stationary tapered iron is used, forming an iron strip adapted to be magnetized by the coil and being arranged close to the cylindrical face of the coil. In this case the flux is not so highly concentrated in the movable and the fixed iron but instead a great part goes through the said tapered iron. Hence it is very difficult to adjust the additional iron so that the scale might have a desirable distribution. Any possibility of graduating the crowded portion of the scale does not exist as the position of the pointer within said part is very unstable.

The object of the present invention is to provide an instrument having the crowded part of the scale sharply limited and having a certain scale distribution, for example uniform, of the remaining portion of the scale up to the initial point of the crowded part. A further object of the invention is to provide an instrument of highly simplified construction by which the adjustment necessary to obtain the desired scale distribution is possible.

The invention will be more closely described with reference to the accompanying drawing, in which:

Fig. 1 is a section through the instrument taken along line A—A of Fig. 2, and

Fig. 2 is a perspective view of the instrument, partly in section.

Referring to the drawing in detail, a fixed iron 2 and a movable iron 3 are disposed within the coil 1. A magnetizable iron strip 5 is fastened as by welding to a non-magnetizable plate which latter is bent to form a hollow cylinder 4 and is disposed in the opening of the coil. The cylinder 4 is turnable by means of the strip 6. A further tapered iron 12 known per se is fastened in the same way as the iron 5 to a cylinder 11 of non-magnetizable material, said cylinder being also turnable within the coil by means of a strip 13. The cylinders 4 and 11 have the same diameter but are of such length in the circumferential direction that their ends overlap over the angle c shown in Fig. 1. During adjustment of the cylinders 4 and 11 the extent of the overlap is increased or decreased. The strips 5 and 12 are applied to the exterior of the cylinders 4 and 11 and consequently spaces a and b are formed at the sides thereof between the cylinder and the internal surface of the coil.

Before adjusting the instrument, the iron 12 is placed in a position such that its shorter edge is just in front of the movable iron 3, when the pointer assumes a position corresponding to the initial calibration "5" of the crowded part of the scale. Thus the tapered iron 12 extends to a point corresponding with the position of the movable iron 3 when the pointer approaches the crowded part of the scale. The moving iron, therefore, when approaching a position corresponding to the crowded part, moves near or beyond the shorter end of iron 12 and when taking such position, the repulsion force exerted by tapered iron 12 on iron 3 is proportionally greater than in other positions of iron 3 and said increase in the repulsive force acting in the direction of deflection is used to damp the repulsive force acting in a direction against the deflection and exerted by iron 5 on movable iron 3. Through this also the last portion of the ordinary scale before the crowded portion gets a uniform distribution and the crowded portion is sharply limited from the uniform portion. The maximum position of the crowded part is now adjustable by displacing iron 5 and the initial position of the crowded part is adjustable by displacing the iron 12.

The thickness and the magnetic permeability of the irons must be chosen with regard to the scale distribution wanted. By the distribution shown in Fig. 1, iron 5 should have greater magnetic permeability than iron 12 if both irons are of the same thickness, and if both irons have the same magnetic permeability, iron 5 should be thicker than iron 12.

It has been proved that the time necessary for the adjustment according to the invention is only a fraction of the time necessary for adjusting an instrument of hitherto known construction. It is also possible to graduate the crowded portion of the scale, the position of the pointer being very stable.

The invention is not limited to the embodiment described but is to be modified in several manners, e. g. it is not necessary that the iron 5 is formed as a rectangular strip but it can have another suitable form.

I claim:

1. Measuring instrument provided with a crowded part at the upper portion of the scale and comprising a coil, a pointer shaft, two radially disposed iron strips arranged in the magnetic field of said coil, one of the strips being movable and fastened to the pointer shaft, the other strip being stationary and disposed within the coil, an auxiliary strip consisting of a magnetizable material preferably having a low remanence and so located at the upscale end of the path of movement of the moving iron strip, that as the latter approaches a position corresponding to the crowded part of the scale said auxiliary strip exerts a repulsive action on said moving iron strip in a direction opposite to the direction of deflection, a further auxiliary strip of magnetizable material tapering in the upscale direction and extending from the stationary iron strip to a position on the cylindrical face of the coil corresponding to that which the moving iron strip occupies when the pointer is approaching the crowded part of the scale.

2. Measuring instrument according to claim 1 having separate means for angular adjustment of both said auxiliary strips.

3. Measuring instrument according to claim 1 having separate means for angular adjustment of both said auxiliary strips, each of said means consisting of a cylindrically shaped sheet of nonmagnetizable material to which the related strip is fastened and which is turnably disposed within the opening of the coil.

ALBERT EMANUEL ANDERSSON.

REFERENCES CITED

The following references are of record in the file of this patent:

UNITED STATES PATENTS

| Number | Name | Date |
|---|---|---|
| 2,183,566 | Hoare | Dec. 19, 1939 |
| 2,183,685 | Lingg | Dec. 19, 1939 |
| 2,260,026 | Hoare | Oct. 21, 1941 |

FOREIGN PATENTS

| Number | Country | Date |
|---|---|---|
| 364,206 | Great Britain | Jan. 7, 1932 |